United States Patent
Sogi et al.

(10) Patent No.: US 12,524,982 B2
(45) Date of Patent: Jan. 13, 2026

(54) NON-TRANSITORY COMPUTER READABLE RECORDING MEDIUM, VISUALIZATION METHOD AND INFORMATION PROCESSING APPARATUS

(71) Applicants: FUJITSU LIMITED, Kawasaki (JP); University of Tsukuba, Tsukuba (JP)

(72) Inventors: Naoya Sogi, Tsukuba (JP); Tomoki Uchiyama, Tsukuba (JP); Kazuhiro Fukui, Tsukuba (JP); Koichiro Niinuma, Pittsburgh, PA (US)

(73) Assignees: Fujitsu Limited, Kawasaki (JP); UNIVERSITY OF TSUKUBA, Tsukuba (JP)

( * ) Notice: Subject to any disclaimer, the term of this patent is extended or adjusted under 35 U.S.C. 154(b) by 659 days.

(21) Appl. No.: 17/709,455

(22) Filed: Mar. 31, 2022

(65) Prior Publication Data
US 2023/0316700 A1    Oct. 5, 2023

(51) Int. Cl.
*G06V 10/36* (2022.01)
*G06V 10/764* (2022.01)

(52) U.S. Cl.
CPC ............ *G06V 10/36* (2022.01); *G06V 10/764* (2022.01)

(58) Field of Classification Search
CPC .... G06V 10/36; G06V 10/764; G06V 10/776; G06V 10/82; G06V 10/25; G06V 10/945
See application file for complete search history.

(56) References Cited

U.S. PATENT DOCUMENTS

| | | | |
|---|---|---|---|
| 9,740,949 B1* | 8/2017 | Khosla | G06V 10/451 |
| 2019/0206134 A1* | 7/2019 | Devam | G06F 3/011 |
| 2019/0370587 A1* | 12/2019 | Burachas | G06T 11/60 |
| 2020/0074243 A1* | 3/2020 | Gu | G06V 10/764 |
| 2020/0214559 A1* | 7/2020 | Krueger | A61B 5/163 |
| 2020/0305708 A1* | 10/2020 | Krueger | G06F 3/013 |
| 2021/0058485 A1* | 2/2021 | Devam | G02B 27/017 |

OTHER PUBLICATIONS

Zeiler et al., "Visualizing and Understanding Convolutional Networks", In: Fleet D., Pajdla T., Schiele B., Tuytelaars T. (eds) Computer Vision—ECCV 2014. Lecture Notes in Computer Science, vol. 8689, 2014, pp. 818-833.

* cited by examiner

*Primary Examiner* — Andrew W Bee
*Assistant Examiner* — D J Dhooge
(74) *Attorney, Agent, or Firm* — XSENSUS LLP (57) ABSTRACT

An information processing apparatus acquires an image; generates a shielding image in which a part of an area included in an area of the acquired image has been shielded; calculates, by inputting the image to a first model that has been trained, first likelihood of the target object included in the image; calculates, by inputting the shielding image to a second model that calculates an approximation value of likelihood of the target object included in the image when the image is input, second likelihood corresponding to the approximation value of the likelihood of the target object included in the shielding image; specifies, based on the first likelihood and the second likelihood, an area that affects discrimination of the class and that is included in the area of the image; and displays the specified area that affects discrimination of the class.

12 Claims, 8 Drawing Sheets

| ITEM NO. | SHIELDING IMAGE DATA | SHIELDING AREA COORDINATES | LIKELIHOOD (APPROXIMATION VALUE) |
|---|---|---|---|
| 1 | SHIELDING IMAGE DATA WITH ITEM NO. 1 | $(x_{a1}, y_{a1}), (x_{a2}, y_{a2})$ | APPROXIMATION VALUE OF LIKELIHOOD OF TARGET OBJECT INCLUDED IN SHIELDING IMAGE DATA WITH ITEM NO. 1 |
| 2 | SHIELDING IMAGE DATA WITH ITEM NO. 2 | $(x_{b1}, y_{b1}), (x_{b2}, y_{b2})$ | APPROXIMATION VALUE OF LIKELIHOOD OF TARGET OBJECT INCLUDED IN SHIELDING IMAGE DATA WITH ITEM NO. 2 |
| 3 | SHIELDING IMAGE DATA WITH ITEM NO. 3 | $(x_{c1}, y_{c1}), (x_{c2}, y_{c2})$ | APPROXIMATION VALUE OF LIKELIHOOD OF TARGET OBJECT INCLUDED IN SHIELDING IMAGE DATA WITH ITEM NO. 3 |
| ... | ... | ... | ... |

NON-TRANSITORY COMPUTER READABLE RECORDING MEDIUM, VISUALIZATION METHOD AND INFORMATION PROCESSING APPARATUS

FIELD

The embodiment discussed herein is related to a non-transitory computer readable recording medium having recorded therein a visualization program, a visualization method, and an information processing apparatus.

BACKGROUND

When a target object included in an image is recognized, a deep learning model (hereinafter, referred to as a "DL model") is used. The DL model is often used as a black box; however, by understanding the basis of a behavior of the DL model, it is possible to improve the performance of the DL model or it is possible to use the DL model without any worries, so that there is a demand for a technology for visualizing the DL model.

For example, as a conventional technology for visualizing the DL model, an occlusion sensitivity map (OSM) or the like is present. In the conventional technology (OSM, etc.), when the DL model discriminates classes of image data, an image area that is important for discrimination is visualized.

Figure 8:
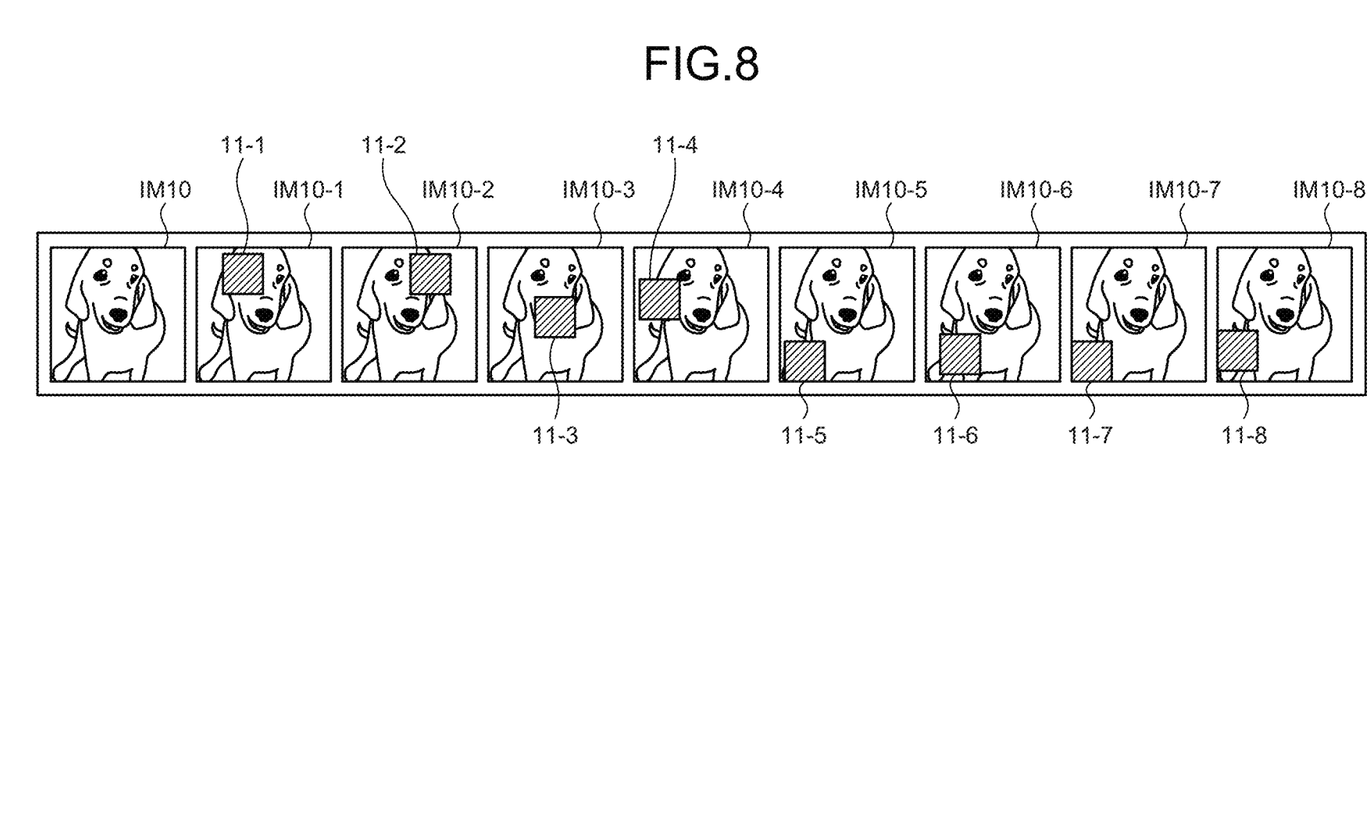
FIG. 8 is a diagram illustrating a conventional technology.

FIG. 8 is a diagram illustrating the conventional technology. In the conventional technology, a plurality of shielding images are generated while the position of the shielding area being changed with respect to an image IM10 that is the original image. For example, by setting a shielding area 11-1 to the image IM10, a shielding image IM10-1 is generated. In the conventional technology, in a similar manner for the other images, shielding images IM10-2 to IM10-8 are generated by setting shielding areas 11-2 to 11-8 with respect to the image IM10.

In the conventional technology, the image IM10 is input to the DL model, and a class similarity that acts as the reference is calculated. The class similarity that acts as the reference is referred to as a reference class similarity.

In the conventional technology, the class similarity of the shielding image IM10-1 is calculated by inputting the shielding image IM10-1 to the DL model. In the conventional technology, in a similar manner for the others, the class similarity of each of the shielding images IM10-2 to 10-8 is calculated by inputting the shielding images IM10-2 to 10-8 to the DL model.

In the conventional technology, by comparing each of the class similarities of the shielding images IM10-1 to 10-8 to the reference class similarity, the shielding image that exhibits a large drop in the class similarity is specified, and the shielding area of the specified shielding image is highlighted as an area that is important for discrimination of the class.

Figure 9:
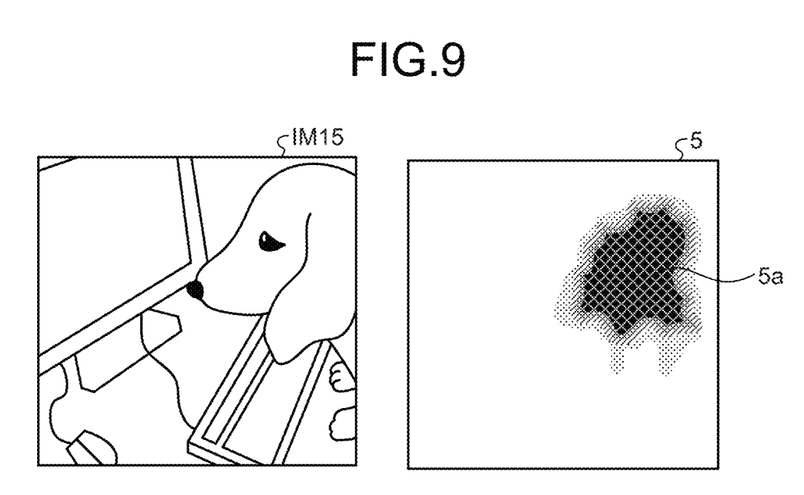
FIG. 9 is a diagram illustrating a processing result obtained in the conventional technology.

FIG. 9 is a diagram illustrating a processing result of the conventional technology. In FIG. 9, it is assumed that an image IM15 is the original image that has been used to visualize the DL model. The execution result obtained in the conventional technology indicates the one indicated by an execution result 5, and an area 5a is highlighted as an area that is important for discrimination of the class.

Non-Patent Literature 1: Zeiler M. D., Fergus R. "Visualizing and Understanding Convolutional Networks" In: Fleet D., Pajdla T., Schiele B., Tuytelaars T. (eds) Computer Vision—ECCV 2014. Lecture Notes in Computer Science, vol 8689. Springer, Cham However, in the conventional technology described above, calculation is performed, by using the DL model, on all of the shielding images each having a different shielding area, so that it takes time to specify the image area that is important for discrimination of the class.

Accordingly, it is an object in one aspect of an embodiment of the present invention to provide a non-transitory computer readable recording medium, a visualization method, and an information processing apparatus capable of reducing time needed to specify an image area that is important for discrimination of the class.

SUMMARY

According to an aspect of an embodiment, a non-transitory computer-readable recording medium has stored therein a visualization program that causes a computer to execute a process including acquiring an image; generating a shielding image in which a part of an area included in an area of the acquired image has been shielded; calculating, by inputting the image to a first model that has been trained by inputting the image and outputting a class of a target object included in the image, first likelihood of the target object included in the image; calculating, by inputting the shielding image to a second model that calculates an approximation value of likelihood of the target object included in the image when the image is input, second likelihood corresponding to the approximation value of the likelihood of the target object included in the shielding image; specifying, based on the first likelihood and the second likelihood, an area that affects discrimination of the class and that is included in the area of the image; and displaying the specified area that affects discrimination of the class.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of a non-transitory computer readable recording medium having recorded a visualization program disclosed in the present invention, a visualization method, and an information processing apparatus will be described in detail below with reference to the accompanying drawings. Furthermore, the present invention is not limited by the present embodiment. In addition, each of the embodiments can be used in any appropriate combination as long as processes do not conflict with each other.

In the information processing apparatus according to the present embodiment, when specifying, by using a shielding image in which a part of an area of the image has been shielded, an image area that is important for discrimination of class, the information processing apparatus calculates, by using an approximate model based on the Taylor expansion, likelihood of a target object that is included in the shielding image, so that a calculation cost is reduced.

Figure 1:
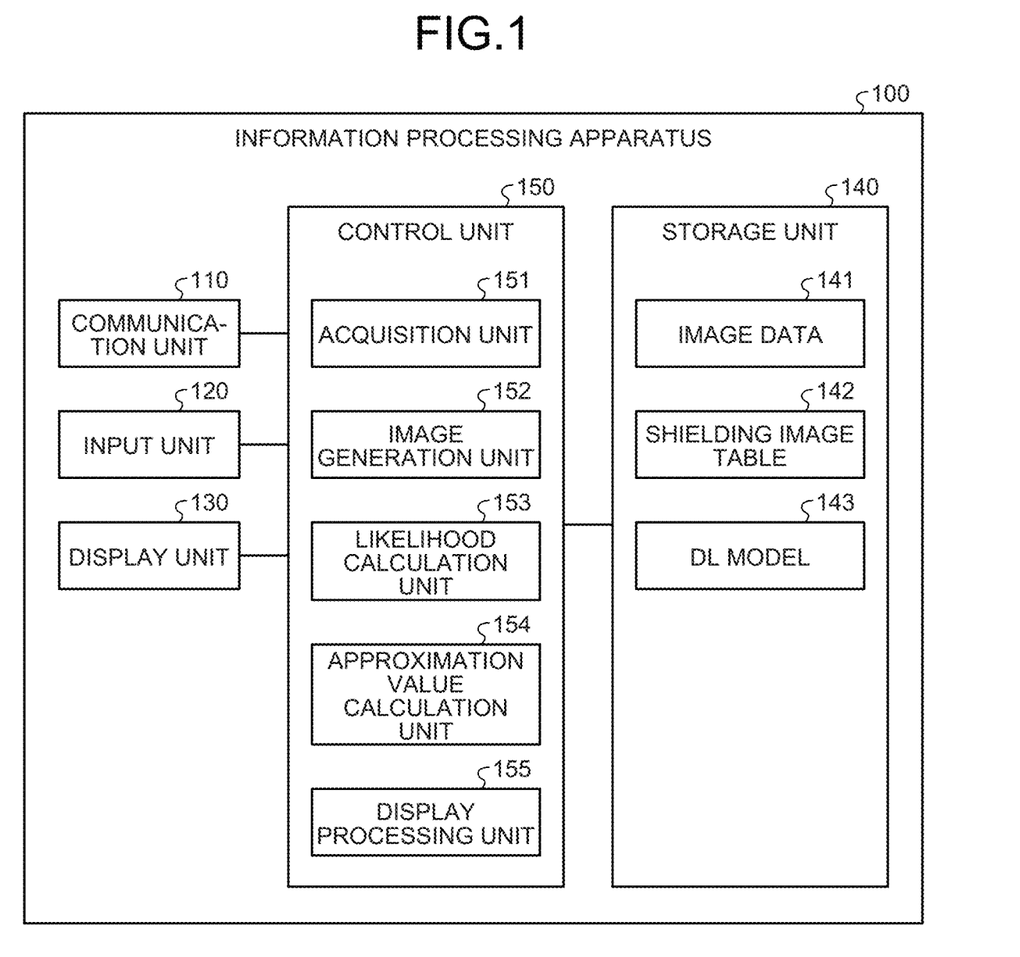
FIG. 1 is a functional block diagram illustrating a configuration of an information processing apparatus according to a present embodiment.

FIG. 1 is a functional block diagram illustrating a configuration of the information processing apparatus according to the present embodiment. As illustrated in FIG. 1, an information processing apparatus 100 includes a communication unit 110, an input unit 120, a display unit 130, a storage unit 140, and a control unit 150.

The communication unit 110 performs data communication with an external device via a network. The communication unit 110 receives image data 141 corresponding to a processing target from the external device. The communication unit 110 may receive data of a trained DL model 143 from the external device.

The input unit 120 is an input device that receives an operation performed by a user and is implemented by, for example, a keyboard, a mouse, or the like.

The display unit 130 is a display device for outputting a processing result obtained by the control unit 150 and is implemented by, for example, a liquid crystal monitor, a printer, or the like.

The storage unit 140 includes the image data 141, a shielding image table 142, and the DL model 143. The storage unit 140 is a storage device that stores therein various kinds of information and is implemented by, for example, a semiconductor memory device, such as a random access memory (RAM) or a flash memory, or a storage device, such as a hard disk or an optical disk.

The image data 141 is image data corresponding to the processing target. For example, in the image data 141, a plurality of pixels are included, and a pixel value is set to each of the pixels. By shielding a part of the area of the image data 141, shielding image data that will be described later is generated.

Figure 2:
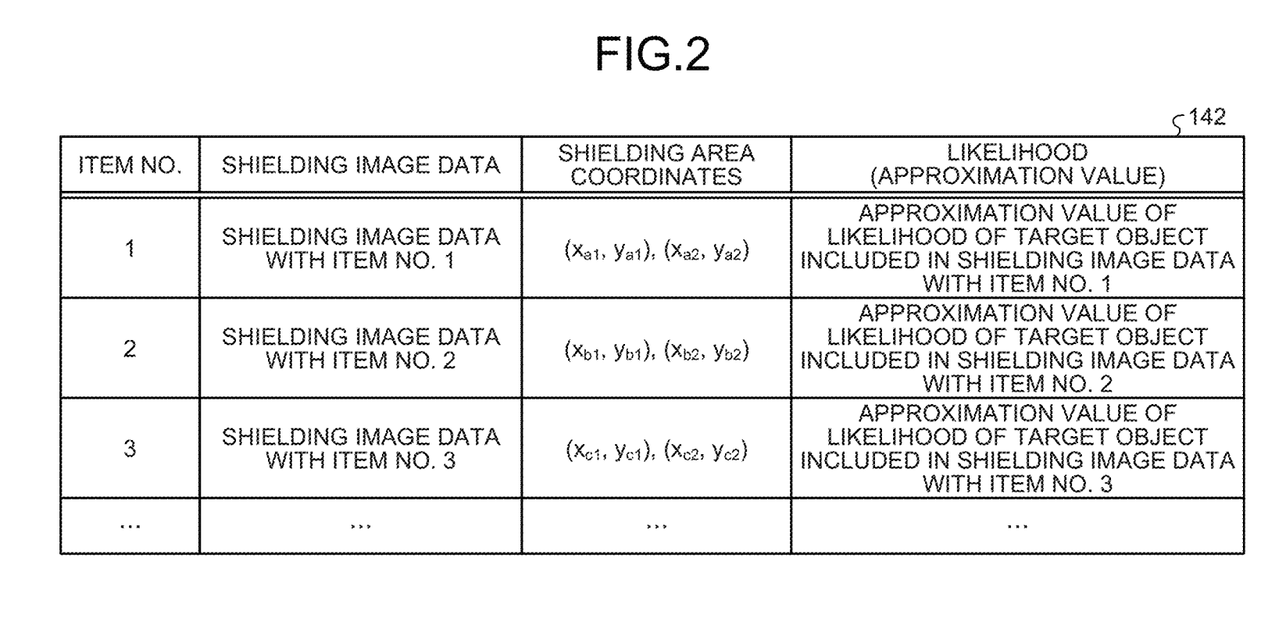
FIG. 2 is a diagram illustrating an example of a data structure of a shielding image table.

The shielding image table 142 is a table that holds a plurality of shielding images in each of which a part of the area of the image data 141 has been shielded. FIG. 2 is a diagram illustrating an example of a data structure of the shielding image table. As illustrated in FIG. 2, the shielding image table 142 includes an item number, shielding image data, shielding area coordinates, and likelihood (approximation value).

The item number indicates a number for identifying a record (shielding image data) stored in the shielding image table 142. The shielding image data indicates image data in which a part of the area (small area) included in the entire area of the image data 141 has been shielded. In a description below, a shielded area is referred to as a "shielding area". The shielding area coordinates indicates the coordinates of the shielding area. For example, in the shielding area coordinates, the coordinates at the top left corner of the shielding area and the coordinates at the bottom right corner of the shielding area are set. In the likelihood, an approximation value of the likelihood of the target object included in the shielding image data is set.

The DL model 143 is a model that has been trained by inputting image data and outputting a class of a target object included in the image data. For example, the DL model 143 is a convolutional neural network (CNN). The DL model 143 is an example of a "first model".

Figure 3:
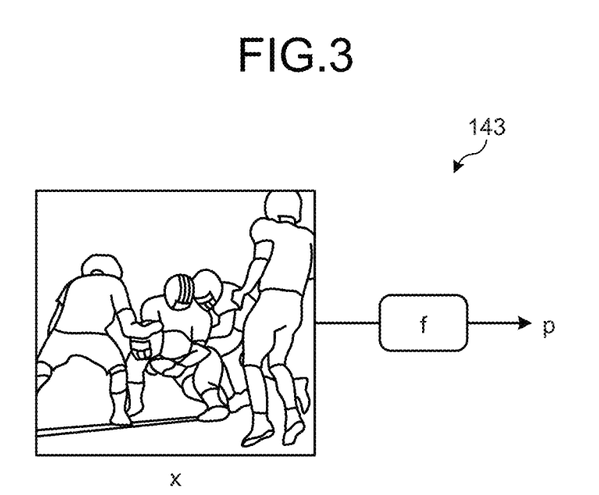
FIG. 3 is a diagram illustrating an example of a DL model.

FIG. 3 is a diagram illustrating an example of the DL model. For example, the DL model 143 is represented by a function "f", and the image data 141 that is input to the DL model 143 is denoted by "x". If image data x is input to the DL model 143, likelihood (probability) "p" of the target object included in the image data x is output and is represented by "f(x)=p".

A description will be given here by referring back to FIG. 1. The control unit 150 is implemented by causing a processor, such as a central processing unit (CPU) or a micro processing unit (MPU), to execute various programs stored in an internal storage device included in the information processing apparatus 100 by using a RAM or the like as a work area. Furthermore, the control unit 150 may be implemented by an integrated circuit, such as an application specific integrated circuit (ASIC) or a field programmable gate array (FPGA).

The control unit 150 includes an acquisition unit 151, an image generation unit 152, a likelihood calculation unit 153, an approximation value calculation unit 154, and a display processing unit 155.

The acquisition unit 151 acquires the image data 141 from an external device or the like. The acquisition unit 151 registers the acquired image data 141 to the storage unit 140. The acquisition unit 151 may acquire the image data 141 via the input unit 120.

The image generation unit 152 generates shielding image data by shielding a part of the area included in the area of the image data 141. The image generation unit 152 registers the relationship between the shielding image data and the shielding area coordinates to the shielding image table 142. The image generation unit 152 generates a plurality of pieces of shielding image data by repeatedly performing the process described above while changing the coordinates of the shielding area.

For example, the process of generating the shielding image data from the image data 141 performed by the image generation unit 152 corresponds to "occ:occlusion" and is denoted by g(x) in Equation (1). In Equation (1), "x" denotes the image data 141 and is a pixel value of each of the pixels, "m" denotes a mask, and "v" denotes a replace value (replace values) and in which a fixed value is set. The symbol between "x" and "m" in Equation (1) denotes the Hadamard Product.

$$occ = g(x) = x \odot m + (1-m) \odot V \quad (1)$$

Figure 4:
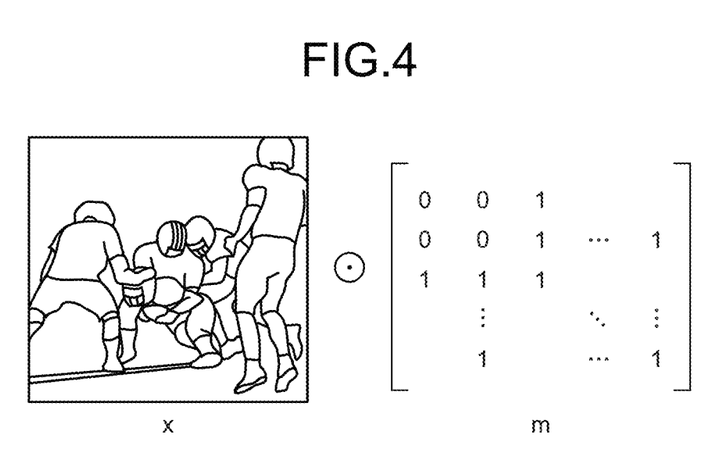
FIG. 4 is a diagram illustrating a mask.

FIG. 4 is a diagram illustrating a mask. As illustrated in FIG. 4, a mask m is indicated by a matrix, and 0 or 1 is set to the component (i,j) in the matrix. For example, if a pixel (i,j) of the image data x is defined as a shielding area, (i,j) in the matrix of the mask m is set to "0". If the pixel (i,j) of the image data x is not defined as the shielding area, (i,j) in the matrix of the mask m is set to "1".

As a result of the image generation unit 152 executing the process corresponding to Equation (1), among the respective pixels included in the image data x, the pixel value of the pixel associated with the component that is included in the matrix of the mask m and that is indicated by "0" is replaced with a value of v.

A description will be given here by referring back to FIG. 1. The likelihood calculation unit 153 calculates the likelihood of the target object included in the image data 141 by inputting the image data 141 to the trained DL model 143. In a description below, the likelihood of the target object included in the image data 141 is referred to as "first likelihood". The likelihood calculation unit 153 outputs the data of the first likelihood to the approximation value calculation unit 154 and the display processing unit 155. In the case where each piece of likelihood of a plurality of classes is output from the DL model 143, the maximum likelihood out of each piece of the likelihood may be defined as the first likelihood.

The approximation value calculation unit 154 calculates, on the basis of the approximation formula, an approximation value of the likelihood of the target object included in the shielding image data. An approximation formula f (g(x)) used by the approximation value calculation unit 154 is represented by the Taylor expansion represented in Equation (2). The approximation formula in Equation (2) is an example of a "second model".

$$f(g(x)) \simeq \qquad (2)$$
$$f(x) + \left(\frac{\partial f}{\partial x}\bigg|x\right)^T (g(x)-x) + \frac{1}{2}(g(x)-x)\left(\frac{\partial f}{\partial x \partial x^T}\bigg|a\right)^T (g(x)-x) + R$$

For example, the approximation value calculation unit 154 calculates the approximation value by using the first term and the second term out of the terms between the first term and the fifth term on the right-hand side in Equation (2). The first term "f(x)" in Equation (2) is the first likelihood that is calculated by the likelihood calculation unit 153. When the approximation value of each piece of the shielding image data generated from the image data 141 is calculated, it is possible to reuse the same first likelihood, so that a calculation cost is reduced. Explanations of x and g(x) included in Equation (2) are the same as that described above in Equation (1).

The approximation value calculation unit 154 acquires the shielding image data from the shielding image table 142 and calculates a approximation value by using the first term and the second term in Equation (2). In a description below, the approximation value of the likelihood of the target object included in the shielding image data is referred to as "second likelihood". The approximation value calculation unit 154 registers the relationship between the shielding image data and the second likelihood to the shielding image table 142. Regarding each piece of the shielding image data in the shielding image table 142, the approximation value calculation unit 154 calculates the second likelihood of each piece of the shielding image data by repeatedly performing the process described above, and then, registers the second likelihood to the shielding image table 142.

The display processing unit 155 compares the first likelihood to each piece of the second likelihood registered in the shielding image table 142, and specifies the shielding image data in which the area that is important for discrimination of the class has been shielded. For example, the display processing unit 155 specifies the shielding area coordinates of the shielding image data in which a difference between the first likelihood and the second likelihood is greater than or equal to a threshold. Hereinafter, the shielding area coordinates specified by the display processing unit 155 is referred to as the specific area coordinates.

The display processing unit 155 generates a display screen of the image data in which the area that is associated with the specific area coordinates and that is included in the area of the image data 141, and then, outputs and displays the generated display screen to and on the display unit 130. The display processing unit 155 may highlight the area in any manner. For example, the display processing unit 155 may fill the area that is associated with the specific area coordinates and that is included in the area of the image data 141 with a predetermined color, or may set the contour of the area that is associated with the specific area coordinates to a predetermined color.

Figure 5:
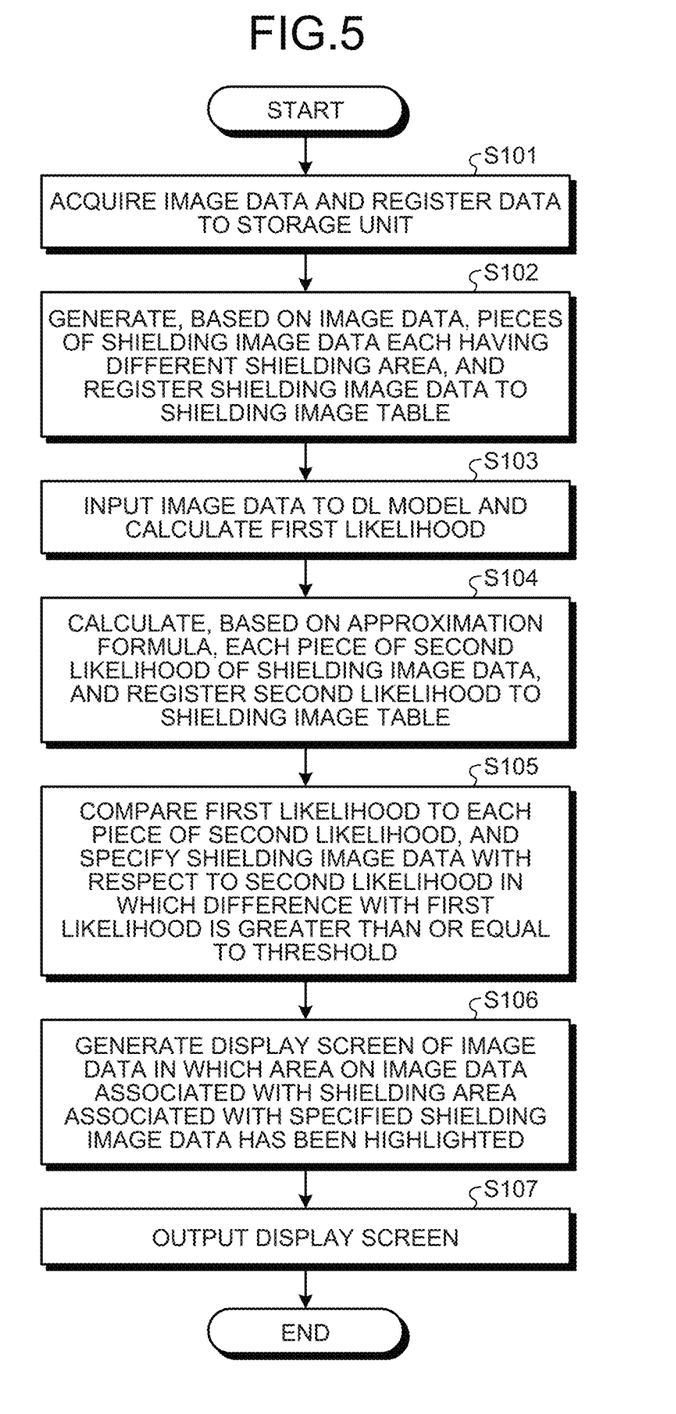
FIG. 5 is a flowchart illustrating the flow of the information processing apparatus according to the present embodiment.

In the following, an example of the flow of the process performed by the information processing apparatus 100 according to the present embodiment will be described. FIG. 5 is a flowchart illustrating the flow of the process performed by the information processing apparatus according to the present embodiment. As illustrated in FIG. 5, the acquisition unit 151 included in the information processing apparatus 100 acquires the image data 141 and registers the acquired image data 141 to the storage unit 140 (Step S101).

The image generation unit 152 included in the information processing apparatus 100 generates a plurality of pieces of shielding image data each having a different shielding area with respect to the image data 141, and registers the generated shielding image data to the shielding image table 142 (Step S102).

The likelihood calculation unit 153 included in the information processing apparatus 100 inputs the image data 141 to the DL model 143 and calculates the first likelihood (Step S103). The approximation value calculation unit 154 included in the information processing apparatus 100 calculates, on the basis of the approximation formula, each piece of the second likelihood of the associated piece of shielding image data, and registers the calculated second likelihood to the shielding image table 142 (Step S104).

The display processing unit 155 included in the information processing apparatus 100 compares the first likelihood to each piece of the second likelihood, and specifies the shielding image data with respect to the second likelihood in which a difference with the first likelihood is greater than or equal to the threshold (Step S105).

The display processing unit 155 generates a display screen of the image data in which the area on the image data 141 associated with the shielding area of the specified shielding image data has been highlighted (Step S106). The display processing unit 155 outputs and displays the generated display screen to and on the display unit 130 (Step S107).

In the following, the effect of the information processing apparatus 100 according to the present embodiment will be described. The information processing apparatus 100 calculates the first likelihood by inputting the image data 141 to the DL model 143, and then, calculates, on the basis of the approximation formula, the approximation value (the second likelihood) of the likelihood associated with the plurality of pieces of shielding image data. The information processing apparatus 100 specifies, on the basis of the first likelihood and the plurality of pieces of second likelihood, the area that is included in the image data and that affects discrimination of the class, and then displays the specified area. In this way, when the second likelihood of the shielding image data is calculated, by using the approximation formula, it is possible to reduce the time needed to specify the image area that is important for discrimination of the class.

For example, in the conventional technology, when the likelihood of the plurality of pieces of shielding image data is calculated, each piece of the shielding image data is input to the DL model and the likelihood of each piece of the shielding image data is calculated. In contrast, the information processing apparatus 100 according to the present embodiment, as represented by Equation (2), if the image data 141 is input to the DL model 143 and the first likelihood is calculated once, it is possible to calculate the second likelihood of each piece of the shielding image data by diverting the calculated first likelihood, so that it is possible to reduce a calculation cost.

The information processing apparatus 100 specifies, as the area that affects discrimination of the class, the area of the image data 141 that corresponds to the same area as the shielded area of the shielding image data that is related to the second likelihood out of the plurality of pieces of second likelihood and in which a difference with the first likelihood is greater than or equal to the threshold. As a result, it is possible to appropriately specify the area that affects discrimination of the class.

When the information processing apparatus 100 generates the shielding image data, the information processing apparatus 100 generates the shielding image data by changing the pixel value of a part of the area included in the image data 141 to a certain pixel value. For example, the image generation unit 152 included in the information processing apparatus 100 generates the shielding image data by using the pixel value associated with v (replace value) that is set in advance. As a result, it is possible to easily generate the shielding image data.

Furthermore, when the image generation unit 152 included in the information processing apparatus 100 generates the shielding image data, the image generation unit 152 may adjust the pixel value of the area that is shielded on the basis of the pixel value of the area around the area that is shielded. Furthermore, the image generation unit 152 may change the size of the area that is shielded for each piece of the shielding image data.

Figure 6:
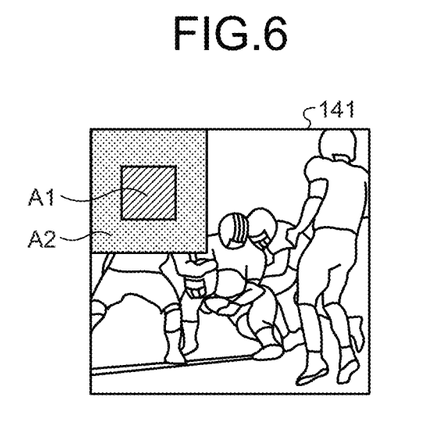
FIG. 6 is a diagram illustrating another process performed by an image generation unit.

FIG. 6 is a diagram illustrating another process performed by the image generation unit. For example, the image generation unit 152 sets the size of the shielding area that is set in the image data 141 to the size of an area A1 at the minimum and to the size of the area A2 at the maximum. The size of each of the areas A1 and A2 is set in advance.

If the value of v is adjusted by the image generation unit 152, the approximation value calculation unit 154 included in the information processing apparatus 100 may calculate the second likelihood of each piece of the shielding image data on the basis of "conditional sampling" represented by Equation (3).

$$f(x) - \Sigma_{v_i} p(v_i|x) f(g(x;m,v_i)) \quad (3)$$

In Equation (3), "$v_i$" denotes a replace value and takes, for example, a value of 0 to 255, "$p(v_i|x)$" denotes a probability (prior probability) of $v_i$ when the pixel value of the area around the shielding area is x and is based on a Gaussian distribution, and $g(x;m,v_i)$ is associated with Equation (1); however, the value of v is not a fixed value, but takes a value of 0 to 255.

Furthermore, Equation (3) is able to be summarized as Equation (5) when a relationship with Equation (4) is used. In Equation (5), "J" denotes a Jacobi matrix, and "$\mu$" is an average value of $v_i$.

$$g(x) - x = (1-m) \odot (v-x) \quad (4)$$

$$f(X) - \Sigma_{v_i} P(v_i|x) f(g(x;m,v_i)) = J_x^T (1-m) \odot (x-\mu) \quad (5)$$

By using Equation (5), the information processing apparatus 100 is able to calculate an approximation value (the second likelihood) with respect to the shielding image data in which the pixels in the shielding area are set in accordance with the pixel values around and the area that is shielded.

Figure 7:
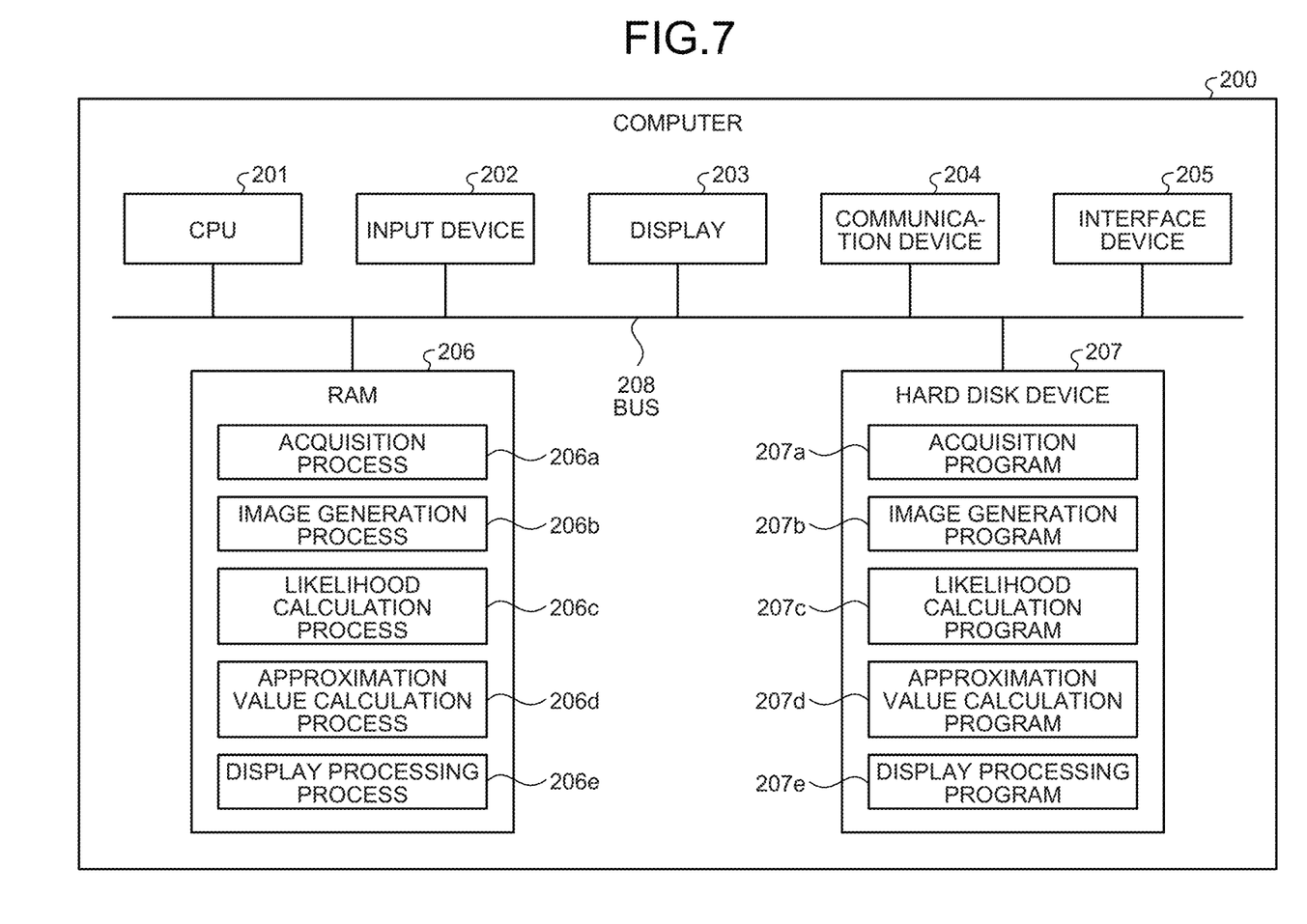
FIG. 7 is a diagram illustrating an example of a hardware configuration of a computer that implements the same function as that performed by the information processing apparatus according to the present embodiment.

In the following, an example of a hardware configuration of a computer that implements the same function as that of the information processing apparatus 100 indicated in the embodiment described above. FIG. 7 is a diagram illustrating an example of a hardware configuration of a computer that implements the same function as that of the information processing apparatus according to the embodiment.

As illustrated in FIG. 7, a computer 200 includes a CPU 201 that implements various kinds of arithmetic processing, an input device 202 that receives an input of data from a user, and a display 203. Furthermore, the computer 200 includes a communication device 204 and an interface device 205 that send and receive data to and from an external device or the like via a wired or wireless network. Moreover, the computer 200 includes a RAM 206 that temporarily stores therein various kinds of information and a hard disk device 207. In addition, each of the devices 201 to 207 is connected to a bus 208.

The hard disk device 207 includes an acquisition program 207a, an image generation program 207b, a likelihood calculation program 207c, an approximation value calculation program 207d, and a display processing program 207e. Furthermore, the CPU 201 reads each of the programs 207a to 207e and loads the programs into the RAM 206.

The acquisition program 207a functions as an acquisition process 206a. The image generation program 207b functions as an image generation process 206b. The likelihood calculation program 207c functions as a likelihood calculation process 206c. The approximation value calculation program 207d functions as an approximation value calculation process 206d. The display processing program 207e functions as a displaying processing process 206e.

The process of the acquisition process 206a corresponds to the process performed by the acquisition unit 151. The image generation process 206b corresponds to the process performed by the image generation unit 152. The process of likelihood calculation process 206c corresponds to the process performed by the likelihood calculation unit 153. The process of the approximation value calculation process 206d corresponds to the process performed by the approximation value calculation unit 154. The process of the displaying processing process 206e corresponds to the process performed by the display processing unit 155.

Furthermore, each of the programs 207a to 207e does not need to be stored in the hard disk device 207 from the beginning. For example, each of the programs is stored in a "portable physical medium", such as a flexible disk (FD), a CD-ROM, a DVD disk, a magneto-optic disk, an IC card, that is to be inserted into the computer 200. Then, the computer 200 may read each of the programs 207a to 207e from the portable physical medium and execute the programs.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable recording medium having stored therein a visualization program that causes a computer to execute a process comprising:
acquiring an image;
generating a rectangle shielding image in which a part of an area included in an area of the acquired image has been shielded;
calculating, by inputting the image to a first model that has been trained by inputting the image and outputting a class of a target object included in the image, first likelihood of the target object included in the image;
calculating, by inputting a plurality of shielding images each having a different area in which the image is shielded to a second model that calculates an approximation value of likelihood of the target object included in the image when the image is input, second likelihood corresponding to the approximation value of the likelihood of the target object included in the shielding image;
specifying an area that affects discrimination of the class and that is included in the area of the image corresponding to a same area as the shielded area of the shielding image that is related to the second likelihood out of the plurality of pieces of second likelihood and in which a difference with the first likelihood is greater than or equal to a threshold; and
displaying the specified area that affects discrimination of the class.

2. The non-transitory computer readable recording medium according to claim 1, wherein the generating the shielding image includes generating the shielding image by changing pixel values of the part of the area that is shielded to a predetermined value.

3. The non-transitory computer readable recording medium according to claim 1, wherein the generating the shielding image includes generating the shielding image by
specifying, based on pixel values of an area around the part of the area that is shielded, pixel values of the part of the area that is shielded, and
changing the pixel values of the part of the area that is shielded to the specified pixel values.

4. The non-transitory computer readable recording medium according to claim 1, wherein the second model is an approximation formula based on a Taylor expansion of the first model.

5. A visualization method comprising:
acquiring an image, using a processor;
generating a rectangle shielding image in which a part of an area included in an area of the acquired image has been shielded, using the processor;
calculating, by inputting the image to a first model that has been trained by inputting the image and outputting a class of a target object included in the image, first likelihood of the target object included in the image, using the processor;
calculating, by inputting a plurality of shielding images each having a different area in which the image is shielded to a second model that calculates an approximation value of likelihood of the target object included in the image when the image is input, second likelihood corresponding to the approximation value of the likelihood of the target object included in the shielding image, using the processor;
specify an area that affects discrimination of the class and that is included in the area of the image corresponding to a same area as the shielded area of the shielding image that is related to the second likelihood out of the plurality of pieces of second likelihood and in which a difference with the first likelihood is greater than or equal to a threshold; and
displaying the specified area that affects discrimination of the class, using the processor.

6. The visualization method according to claim 5, wherein the generating the shielding image includes generating the shielding image by changing pixel values of the part of the area that is shielded to a predetermined value.

7. The visualization method according to claim 5, wherein the generating the shielding image includes generating the shielding image by
specifying, based on pixel values of an area around the part of the area that is shielded, pixel values of the part of the area that is shielded, and
changing the pixel values of the part of the area that is shielded to the specified pixel values.

8. The visualization method according to claim 5, wherein the second model is an approximation formula based on a Taylor expansion of the first model.

9. An information processing apparatus comprising:
a processor configured to
acquire an image;
generate a rectangle shielding image in which a part of an area included in an area of the acquired image has been shielded;
calculate, by inputting the image to a first model that has been trained by inputting the image and outputting a class of a target object included in the image, first likelihood of the target object included in the image;
calculate, by inputting a plurality of shielding images each having a different area in which the image is shielded to a second model that calculates an approximation value of likelihood of the target object included in the image when the image is input, second likelihood corresponding to the approximation value of the likelihood of the target object included in the shielding image;
specify an area that affects discrimination of the class and that is included in the area of the image corresponding to a same area as the shielded area of the shielding image that is related to the second likelihood out of the plurality of pieces of second likelihood and in which a difference with the first likelihood is greater than or equal to a threshold; and
display the specified area that affects discrimination of the class.

10. The information processing apparatus according to claim 9, the processor further configured to generate the shielding image by changing pixel values of the part of the area that is shielded to a predetermined value.

11. The information processing apparatus according to claim 9, the processor further configured to generate the shielding image by
specify, based on pixel values of an area around the part of the area that is shielded, pixel values of the part of the area that is shielded, and
change the pixel values of the part of the area that is shielded to the specified pixel values.

12. The information processing apparatus according to claim 9, wherein the second model is an approximation formula based on a Taylor expansion of the first model.

* * * * *